United States Patent
Uji et al.

(10) Patent No.: US 7,854,790 B2
(45) Date of Patent: Dec. 21, 2010

(54) METHOD OF PROCESSING VOLATILE ORGANIC COMPOUND, ADSORPTION AND DESORPTION APPARATUS, AND SYSTEM FOR PROCESSING VOLATILE ORGANIC COMPOUND

(75) Inventors: Shigekazu Uji, Ichikawa (JP); Masahito Yamaguchi, Yokosuka (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 329 days.

(21) Appl. No.: 11/771,251

(22) Filed: Jun. 29, 2007

(65) Prior Publication Data

US 2008/0006152 A1    Jan. 10, 2008

(30) Foreign Application Priority Data

Jul. 10, 2006   (JP)   .............................. 2006-189516

(51) Int. Cl.
  *B01D 53/02*   (2006.01)
(52) U.S. Cl. .............................. 95/115; 95/114; 95/118; 95/121; 95/139; 96/130; 96/143; 96/145; 96/146
(58) Field of Classification Search .................. 95/115, 95/114, 118, 121, 139, 143, 148; 96/115, 96/121, 130, 143, 146, 96, 145
  See application file for complete search history.

(56) References Cited

U.S. PATENT DOCUMENTS

| | | | |
|---|---|---|---|
| 2,642,153 A | 6/1953 | Parks | 183/114.2 |
| 3,729,902 A | 5/1973 | Ventriglio et al. | 55/389 |
| 5,256,208 A * | 10/1993 | Rafson | 134/25.1 |
| 5,348,573 A * | 9/1994 | Tomassian et al. | 96/151 |
| 5,359,864 A * | 11/1994 | Yamada | 62/480 |

(Continued)

FOREIGN PATENT DOCUMENTS

CA          2 574 536          2/2006

(Continued)

OTHER PUBLICATIONS

Japanese Office Action (Notice of reasons for Rejection), mailed Dec. 12, 2006, with regard to Japanese Patent Application No. 2006-189516 (filed Jul. 10, 2006).

(Continued)

*Primary Examiner*—Michael A Marcheschi
*Assistant Examiner*—Karla Hawkins
(74) *Attorney, Agent, or Firm*—Ostrolenk Faber LLP (57) ABSTRACT

A method of processing a volatile organic compound is provided, wherein a volatile organic compound contained in gas to be treated is adsorbed in an adsorbent; the thus-adsorbed volatile organic compound is desorbed with the aid of steam and mixed in the steam; and the steam containing the volatile organic compound is combusted. This method further includes: separating a vessel for the adsorption and desorption into an inner side room and an outer side room by means of a separation member part of which is formed of the adsorbent; thermally retaining the vessel for the adsorption and desorption; at the time of adsorption, supplying the gas to be treated to the inner side room and therefrom to the outer side room; and at the time of desorption, supplying the steam to the outer side room and therefrom to the inner side room.

13 Claims, 8 Drawing Sheets

U.S. PATENT DOCUMENTS

| | | | |
|---|---|---|---|
| 6,372,018 B1* | 4/2002 | Cowles | 95/18 |
| 6,749,671 B2* | 6/2004 | Holst et al. | 96/108 |
| 2005/0109207 A1* | 5/2005 | Olander et al. | 95/141 |

FOREIGN PATENT DOCUMENTS

| | | |
|---|---|---|
| CA | 25745360 | 2/2006 |
| DE | 2847714 | 5/1980 |
| DE | 3423169 | 1/1985 |
| EP | 0820798 | 1/1998 |
| JP | 52-148484 | 12/1977 |
| JP | 56-089818 | 7/1981 |
| JP | 61-187222 | 11/1986 |
| JP | 63-020020 | 1/1988 |
| JP | 04-200715 | 7/1992 |
| JP | 05-000225 | 1/1993 |
| JP | 2001-113116 | 4/2001 |
| JP | 2003322324 | 11/2003 |
| JP | 2004036492 | 2/2004 |
| JP | 2004184003 | 7/2004 |
| RU | 1780815 | 12/1992 |
| SU | 874138 | 10/1981 |
| SU | 1639725 | 4/1997 |
| WO | WO 2006/019131 | 2/2006 |

OTHER PUBLICATIONS

Office Action in counterpart Russian Patent Application No. 2007125425 dated Aug. 12, 2008, with English language translation (7 pages).

European Search Report dated Nov. 2, 2007.

A Decision on Grant issued Feb. 26, 2009 on the counterpart Russian Patent Application No. 2007125425, with English language translation, 12 pages.

Korean Notice of Allowance of Patent dated Jul. 28, 2009 (with English translation).

* cited by examiner

| INNER DIAMETER OF PURIFICATION VESSEL | 1.0 [m] |
| --- | --- |
| THICKNESS OF PURIFICATION VESSEL | 10 [mm] |
| CLEARANCE BETWEEN PURIFICATION VESSEL AND JACKET VESSEL | 10 [mm] |
| THICKNESS OF JACKET VESSEL | 1 [mm] |
| THICKNESS OF HEAT INSULATOR | 60 [mm] |
| HEIGHT OF APPARATUS | 2.8 [m] |

FIG. 4A

ADSORPTION PROCESS

FIG. 4B

COMPRESSION AND HEATING PROCESS

FIG. 5A

DESORPTION PROCESS

FIG. 5B

COOLING PROCESS

FIG. 6

| | EXAMPLE 1 | EXAMPLE 2 |
|---|---|---|
| FLOW RATE OF GAS CONTAINING VOC | 3756 [m³/hr] | |
| TEMPERATURE OF GAS CONTAINING VOC | 15 [°C] | |
| PRESSURE OF GAS CONTAINING VOC | 0.1 [MPa] | |
| FLOW RATE OF STEAM | 500 [kg/hr] | |
| TEMPERATURE OF STEAM | 191 [°C] | |
| PRESSURE OF STEAM | 1.3 [MPa] | |
| FLOW RATE OF DISCHARGE GAS | 500 [m³/hr] | 800 [m³/hr] |
| TEMPERATURE OF DISCHARGE GAS | 190 [°C] | |
| PRESSURE OF DISCHARGE GAS | 0.1 [MPa] | |
| AMBIENT TEMPERATURE | 15 [°C] | |

METHOD OF PROCESSING VOLATILE ORGANIC COMPOUND, ADSORPTION AND DESORPTION APPARATUS, AND SYSTEM FOR PROCESSING VOLATILE ORGANIC COMPOUND

BACKGROUND OF THE INVENTION

1. Field of the Invention

The present invention relates to a method of processing a gaseous volatile organic compound, an adsorption and desorption apparatus, and a volatile organic compound processing system. The present application is based on Japanese Patent Application No. 2006-189516, filed Jul. 10, 2006, the content of which is incorporated herein by reference.

2. Description of the Related Art

In factories which use various types of volatile organic compounds such as toluene, xylene, or the like, treatment facilities are inevitably provided to process gases containing volatile organic compounds (gases to be treated). In such a facility, according to a typical method of processing a volatile organic compound, gas to be treated (or gas containing a volatile organic compound) is supplied to an adsorption and desorption apparatus where the volatile organic compound is adsorbed in adsorbent such as activated carbon, and the thus-adsorbed volatile organic compound is desorbed from the adsorbent with the aid of steam and then mixed in the steam. Thereafter, the steam mixed with the volatile organic compound is condensed, and the condensed water is distilled such that the volatile organic compound and the water are separated. Finally, the thus-obtained volatile organic compound is combusted and decomposed.

In such a conventional treatment method, in addition to the cost necessary for constructing/installing a treatment facility, the running cost of the facility also increases. To compensate for such inconveniences caused, a technique has been accordingly proposed for processing and decomposing a volatile organic compound, without incurring extra costs, by the use of an existing gas turbine provided in a factory (see, e.g., Japanese Unexamined Patent Applications, First Publications No. 2003-322324, No. 2004-036492, and No. 2004-184003).

For example, in the invention disclosed in Japanese Unexamined Patent Application, First Publication No. 2003-322324, a hazardous substance generated from a volatile organic compound is scavenged therefrom, and supplied to an air intake port of a gas turbine, and then compressed along with air in a compressor. The compressed air containing the hazardous substance is supplied to a combustor and fuel gas is concurrently supplied thereto, and they are combusted to thereby drive a turbine. The hazardous substance is combusted in the combustor and thus rendered harmless, and then discharged into the atmosphere together with exhaust gas of the gas turbine. In the meantime, in the inventions disclosed in Japanese Unexamined Patent Applications, First Publications No. 2004-036492 and No. 2004-184003, waste fluid containing a volatile organic compound is directly supplied to a combustor and fuel gas is concurrently supplied thereto, and they are combusted to thereby drive a turbine. The waste fluid containing a hazardous substance is combusted in the combustor and rendered harmless, and then discharged into the atmosphere together with exhaust gas of the gas turbine.

However, in the above-mentioned method of the volatile organic compound, in which the volatile organic compound is desorbed from the adsorbent with the aid of steam, part of the steam is condensed and becomes part of condensed water at the time of desorbing. Although the condensed water is discharged from the adsorption and desorption apparatus as drain water, a small amount of the volatile organic compound is contained or remains in this condensed water. To achieve a more complete process and decomposition of the volatile organic compound, it is necessary to decompose even the volatile organic compound contained in the drain water. As a concrete measure, it is necessary to separately or additionally provide a waste water treatment plant. This involves an inconvenience or increase of the cost of the facility. Especially, the larger the amount of the drain water, the larger the scale of the waste water treatment plant. That is to say, the larger the amount of the drain water, the higher the cost of facility.

The applicant consequently developed a technique to suppress or prevent such condensing of the steam, in which an adsorption and desorption apparatus to which compressed air is supplied is operated under high pressure. When the adsorption and desorption apparatus is structured such that it can endure such a high pressure, the wall thickness of a vessel of which necessarily becomes large. Accordingly, the heat capacity of the vessel is increased, so that rise in temperature thereof takes a long time at a heating process prior to a desorption process. When the heating process necessitates such a long time, to promote process efficiency, it is necessary to increase the capacity of the adsorption and desorption apparatus or to increase the amount of activated carbon (absorbent) used therein, thus resulting in an inconvenience or cost increase.

SUMMARY OF THE INVENTION

The present invention has been devised in consideration of the above circumstances. An object of the present invention is to obtain much higher throughput while suppressing condensing of steam at the time of desorption. A further object of the present invention is to reduce cost for processing a volatile organic compound.

In order to achieve the above object, according to the present invention, a method is provided as a first solution means according to a method of processing a volatile organic compound, comprising: adsorbing in an adsorbent a volatile organic compound contained in gas to be treated; desorbing the thus-adsorbed volatile organic compound with the aid of steam and mixing it in the steam, under a pressurized state; and combusting the steam containing the volatile organic compound in a combustor, said method of processing further comprising: separating a vessel for the adsorption and desorption into an inner side room and an outer side room by means of a separation member part of which is formed of the adsorbent; thermally retaining the vessel for the adsorption and desorption; at the time of adsorption, supplying the gas to be treated to the inner side room and hence to the outer side room through the separation member; and at the time of desorption, supplying the steam to the outer side room and hence to the inner side room through the separation member.

Further, as a second solution means according to the volatile organic compound processing method, a means is provided in the first solution means, wherein the vessel for the adsorption and desorption is covered with a fluid having a predetermined temperature such that the vessel is thermally retained.

As a third solution means according to the volatile organic compound processing method, a means is provided in the first or the second solution means, wherein the fluid includes discharge gas of the combustor.

As a fourth solution means according to the volatile organic compound processing method, a means is provided in one of the first to the third solution means, wherein, after completion of the adsorption, the vessel is heated by supplying high-temperature compressed air and steam mixed gas to the inside of the vessel.

As a fifth solution means according to the volatile organic compound processing method, a means is provided in the fourth solution means, wherein, when the ambient temperature of the adsorbent reaches to a predetermined level, the supply of the mixed gas is stopped.

As a sixth solution means according to the volatile organic compound processing method, a means is provided in the fourth solution means, wherein, when the ambient temperature of the adsorbent reaches to a predetermined level and when a drain formed of the steam being condensed is reevaporated, the supply of the mixed gas is stopped.

As a seventh solution means according to the volatile organic compound processing method, a means is provided in one of the fourth to the sixth solution means, wherein, at the time of the heating, the mixed gas is supplied to the outer side room and then through the separation member to the inner side room.

As a eighth solution means according to the volatile organic compound processing method, a means is provided in one of the first to the seventh solution means, wherein, after completion of the desorption, the vessel is cooled by supplying air to the inside of the vessel.

As a ninth solution means according to the volatile organic compound processing method, a means is provided in the eighth solution means, wherein, at the time of the cooling, the air is supplied to the inner side room and then through the separation member to the outer side room.

Further, as a first means according to an adsorption and desorption apparatus, a means is provided, wherein a volatile organic compound contained in gas to be treated is adsorbed in a predetermined adsorbent, and the thus-adsorbed volatile organic compound is desorbed with the aid of steam and then mixed in the steam under a pressurized environment, said adsorption and desorption apparatus comprising: a vessel for the adsorption and desorption; a separation member part of which is formed of the adsorbent and by means of which the vessel is separated into an inner side room and an outer side room; and a heat retainer to thermally retain the vessel, wherein the gas to be treated is supplied to the inner side room and then through the separation member to the outer side room, and the steam is supplied to the outer side room and then through the separation member to the inner side room.

Still further, as a second means according to the adsorption and desorption apparatus, a means is provided in the first means, wherein the heat retainer includes a jacket with which the vessel is covered and a fluid having a predetermined temperature which flows through the jacket and the vessel.

Yet further, as a first solving means according to a system for a volatile organic compound, a means is provided, comprising; the adsorption and desorption apparatus as recited in the first or the second means; and a combustor in which the steam containing the volatile organic compound is combusted.

As a second solving means according to the system for a volatile organic compound, a means is provided in the first solving means, wherein a fluid which flows in the heat retainer is discharge gas of the combustor.

In the present invention, the vessel is thermally retained even if the vessel has a thick wall so as to be durable under a compressed state and accordingly has a large heat capacity, and further, the vessel is separated into an inner side room and an outer side room by means of a separation member part of which is formed of the adsorbent, and the gas to be treated is supplied, at the of adsorption, to the inner side room and hence to the outer side room through the separation member, and the steam is supplied, at the time of desorption, to the outer side room and hence to the inner side room through the separation member. At the time of adsorption, the adsorbent is cooled by being exposed to the gas to be treated having a normal temperature, and as a result, the adsorbing function can be upgraded. At the time of desorption, the adsorbent is heated by being exposed to the heated steam, and as a result, the desorbing function can be upgraded. Further, since the vessel is satisfactorily heat-retained, it is possible to prevent the vessel from adsorbing heat to raise the inner temperature of the vessel. Accordingly, the high throughput capacity can be obtained while suppressing condensing of steam at the time of desorption.

Furthermore, in the third solution means according to the present invention, the vessel is heated by the use of the discharge gas of the combustor. The necessary structure such as described above can be obtained at low cost, and as a result, it is possible to reduce cost for processing the volatile organic compound.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIGS. 4A and 4B are views illustrating states of each process in the adsorption and desorption apparatus in the embodiment according to the present invention: FIG. 4A illustrates the adsorption process.

FIGS. 5A and 5B are views illustrating states of each process in the adsorption and desorption apparatus in the embodiment according to the present invention, FIG. 5A illustrates the desorption process.

DETAILED DESCRIPTION OF THE INVENTION

Figure 1:
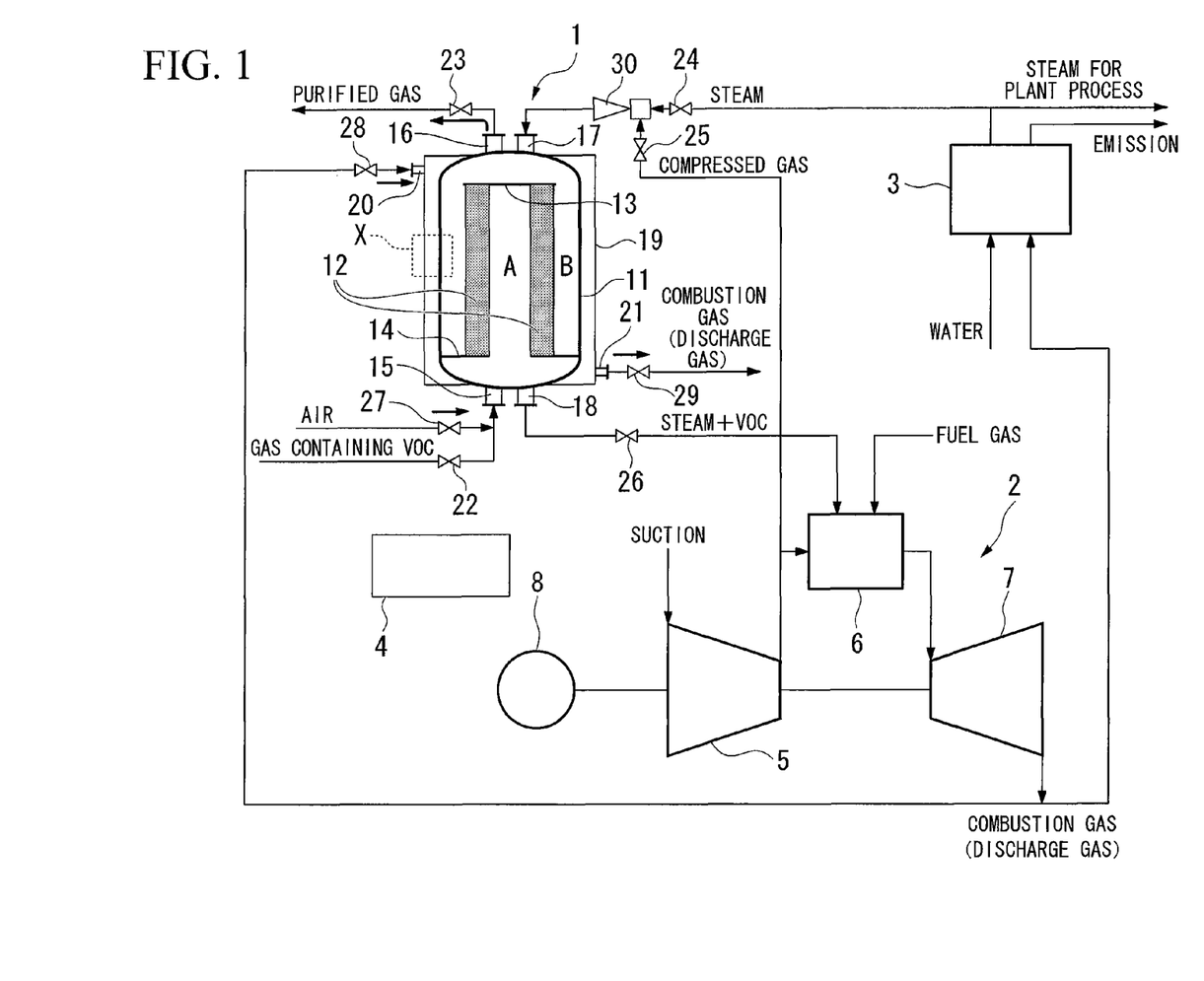
FIG. 1 is a general schematic view illustrating a volatile organic compound processing system formed in a plant where a process of a volatile organic compound is to be carried out according to an embodiment of the present invention.

With reference to the drawings, an embodiment of the present invention will now be described. FIG. 1 is a general schematic view illustrating a volatile organic compound processing system formed in a plant where a process of a volatile organic compound is to be carried out, according to the embodiment of the present invention. The present system is provided with an adsorption and desorption apparatus 1, a gas turbine 2, a heat exchanger 3, and a control unit 4.

The adsorption and desorption apparatus 1 is an apparatus where a volatile organic compound (VOC) contained in untreated gas (or gas to be treated) is absorbed in an adsorbent and the thus-adsorbed volatile organic compound is desorbed with the aid of pressurized steam thereby being mixed in the steam. As an example of the adsorbent, activated carbon may be used. Details thereof will be described later.

The gas turbine is provided with a compressor 5, a combustor 6, and a turbine 7. The compressor 5 compresses drawn air and then supplies it to the combustor 6 as pressurized air. The combustor 6 mixes fuel gas with the pressurized air supplied from the compressor 5 and combusts or burns the mixture to thereby generate combustion gas, and then discharges the thus-generated combustion gas to the turbine 7. Further, the steam containing the VOC is supplied to the combustor 6 and thereat combusted together with fuel gas. The turbine 7 is driven for rotation due to kinetic energy and pressure energy of the combustion gas supplied from the combustor 6, whereby a driving force for the compressor 5 and a driving force for a load 8 outside of the gas turbine 2 are generated. Part of the combustion gas (discharge gas) discharged from the gas turbine 2 is supplied to the adsorption and desorption apparatus 1 and the rest supplied to the heat exchanger 3. Instead, a structure is possible in which combustion gas to be supplied to the adsorption and desorption apparatus 1 is drawn from the middle or outlet part of the heat exchanger 3.

In the heat exchanger 3, steam is generated by the use of heat of the combustion gas supplied from the gas turbine 2. Part of the steam generated in the heat exchanger 3 is used as plant process steam and the rest of the steam is supplied to the adsorption and desorption apparatus 1.

The control unit 4 controls an overall operation of the present system in accordance with a control program stored in an internal memory, various control data and the like. More specifically, the control unit 4 includes a CPU (Central Processing Unit) which carries out a computation on the basis of various control data and the like and an input/output interface circuit to deliver data to or received data from the above-mentioned parts, i.e., the adsorption and desorption apparatus 1, the gas turbine 2, and the heat exchanger 3. The control unit 4 carries out an overall control of the above-mentioned parts.

Detailed description will be given of the adsorption and desorption apparatus 1. The adsorption and desorption apparatus 1 includes a purification vessel 11, an activated carbon layer 12, an upper partition plate 13, a lower partition plate 14, an intake port 15, an exhaust port 16, a steam inlet port 17, a steam containing VOC outlet port 18, a jacket 19, a discharge gas inlet port 20, a discharge gas outlet port 21, open/close valves 22 to 29, and an ejector 30. In the present embodiment, the activated carbon layer 12, the upper partition plate 13 and the lower partition plate 14 form a separation member. Further, the jacket 19, the discharge gas inlet port 20, the discharge gas outlet port 21, the open/close valve 28, the open/close valve 29 and the gas turbine 2 form a heat-retaining means.

Figure 2:
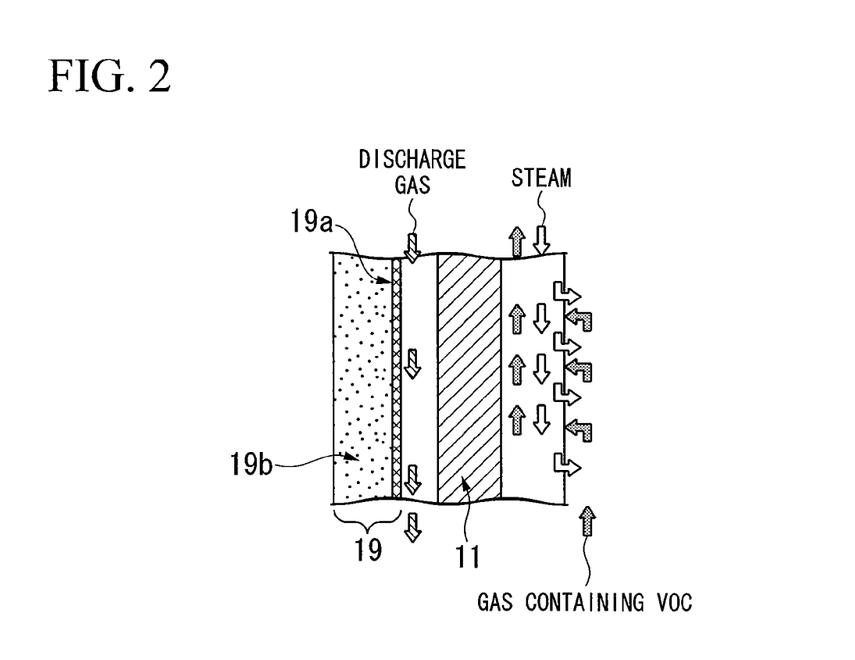
FIG. 2 is a cross-sectional view of a part of a jacket and a purification vessel of an adsorption and desorption apparatus in the embodiment according to the present invention.
Figure 3:
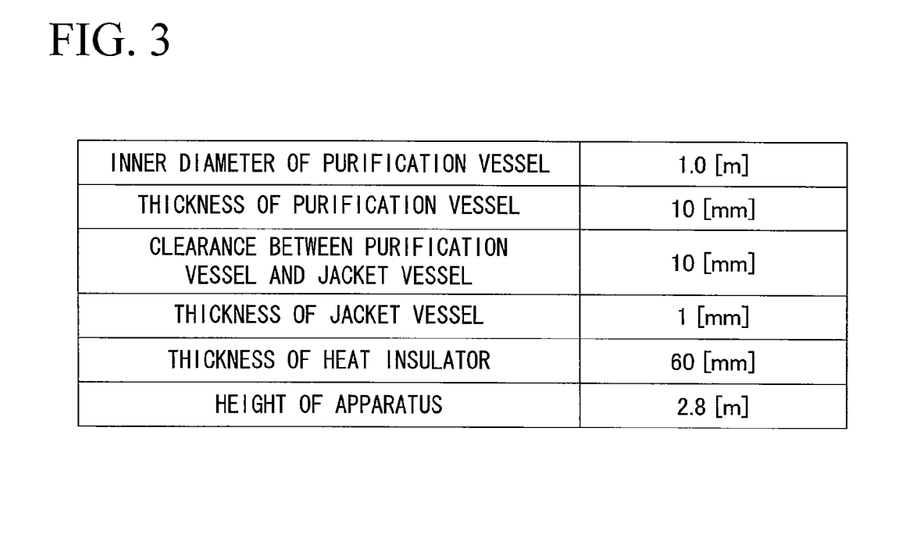
FIG. 3 is a table indicating dimensions of the adsorption and desorption apparatus in the embodiment according to the present invention.

FIG. 2 is a cross-sectional view illustrating part of the purification vessel 11 and the jacket 19 of the adsorption and desorption apparatus 1 (which is indicated by X in FIG. 1). FIG. 3 is a table exhibiting geometrical measurements or dimensions of the adsorption and desorption apparatus 1. Note that such data is intended to assist the understanding of the present invention, and is not intended to limit the scope of the present invention.

The purification vessel 11 is made of metal and has a shape in which end openings of a cylindrical member are closed by dome-shaped members. The activated carbon layer 12 is a cylinder made of activated carbon and received in the purification vessel 11 in a manner axially aligned with respect to a cylindrical portion of the purification vessel 11. The upper partition plate 13 is a disk-shape member and closes one end opening of the activated carbon layer 12. The lower partition plate 14 is a donut-shaped plate member, the inner peripheral portion of which is fixedly secured to the other end opening of the activated carbon layer 12 and the outer peripheral edge of which is fixedly secured to the inner peripheral surface of the purification vessel 11. By means of the thus-formed elements, i.e., the activated carbon layer 12, the upper partition plate 13 and the lower partition plate 14, the inner space of the purification vessel 11 is divided into an inside compartment A and an outside compartment B.

At the bottom of the purification vessel 11, an intake port 15 is provided through which air and gas containing VOC are introduced. At the top of the purification vessel 11, an exhaust port 16 is provided through which purified gas is discharged. At the top of the purification vessel 11, a steam inlet port 17 is also provided through which steam or mixed gas of steam and compressed air are introduced. At the bottom of the purification vessel 11, a steam containing VOC outlet port 18 is provided through which steam containing VOC separated from the gas containing VOC is discharged.

As illustrated in FIG. 2, the jacket 19 includes a drum-shaped vessel 19a and a thermal insulating member 19b which covers the outer surface of the drum-shaped vessel 19a. The purification vessel 11 is housed in the jacket 19. In the vicinity of the top of the jacket 19 is provided a discharge gas inlet port 20 through which discharge gas from the gas turbine 2 is introduced. In the vicinity of the bottom of the jacket 19, a discharge gas outlet port 21 is provided through which discharge gas in the jacket 19 is discharged.

In a flow channel through which gas containing VOC is introduced to the intake port 15, an open/close valve 22 is provided which opens and closes under the control of the control unit 4. The control unit 4 carries out an open/close control of the open/close valve 22 to thereby control a supply/shutoff of the gas containing VOC with respect to the intake port 15.

In a flow channel through which purified gas discharged from the exhaust port 16 flows, an open/close valve 23 is provided which opens and closes under the control of the control unit 4. The control unit 4 carries out an open/close control of the open/close valve 23 to thereby control a discharge/shutoff of the purified gas from the exhaust port 16.

In a flow channel through which steam is introduced to the steam inlet port 17, an open/close valve 24 is provided which opens and closes under the control of the control unit 4. The control unit 4 carries out an open/close control of the open/close valve 24 to thereby control a supply/shutoff of the steam with respect to the steam inlet port 17.

In a flow channel through which compressed air is introduced to the steam inlet port 17, an open/close valve 25 is provided which opens and closes under the control of the control unit 4. The control unit 4 carries out an open/close control of the open/close valve 25 to thereby control a supply/shutoff of the compressed air with respect to the steam inlet port 17.

In a flow channel through which gas containing VOC discharged from the steam containing VOC outlet port 18 flows, an open/close valve 26 is provided which opens and closes under the control of the control unit 4. The control unit 4 carries out an open/close control of the open/close valve 26 to thereby control a discharge/shutoff of the gas containing VOC from the steam containing VOC outlet port 18.

In a flow channel through which air is introduced to the intake port 15, an open/close valve 27 is provided which opens and closes under the control of the control unit 4. The control unit 4 carries out an open/close control of the open/close valve 27 to thereby control a supply/shutoff of the air with respect to the intake port 15.

In a flow channel through which discharge gas is introduced to the discharge gas inlet port 20, an open/close valve 28 is provided which opens and closes under the control of the control unit 4. The control unit 4 carries out an open/close control of the open/close valve 28 to thereby control a supply/shutoff of the discharge gas with respect to the discharge gas inlet port 20.

In a flow channel through which discharge gas discharged from the discharge gas outlet port 21 flows, an open/close valve 29 is provided which opens and closes under the control of the control unit 4. The control unit 4 carries out an open/close control of the open/close valve 29 to thereby control a discharge/shutoff of the discharge gas from the discharge gas outlet port 21.

The ejector 30 is disposed in a flow channel for compressed air and steam between the steam inlet port 17 and the open/close valves 24 and 25 and is activated by the steam, so that the ejector 30 forcibly extracts compressed air and then discharges steam-compressed air mixture or gas when the open/close valve 25 is in an open valve state.

Figure 4A:
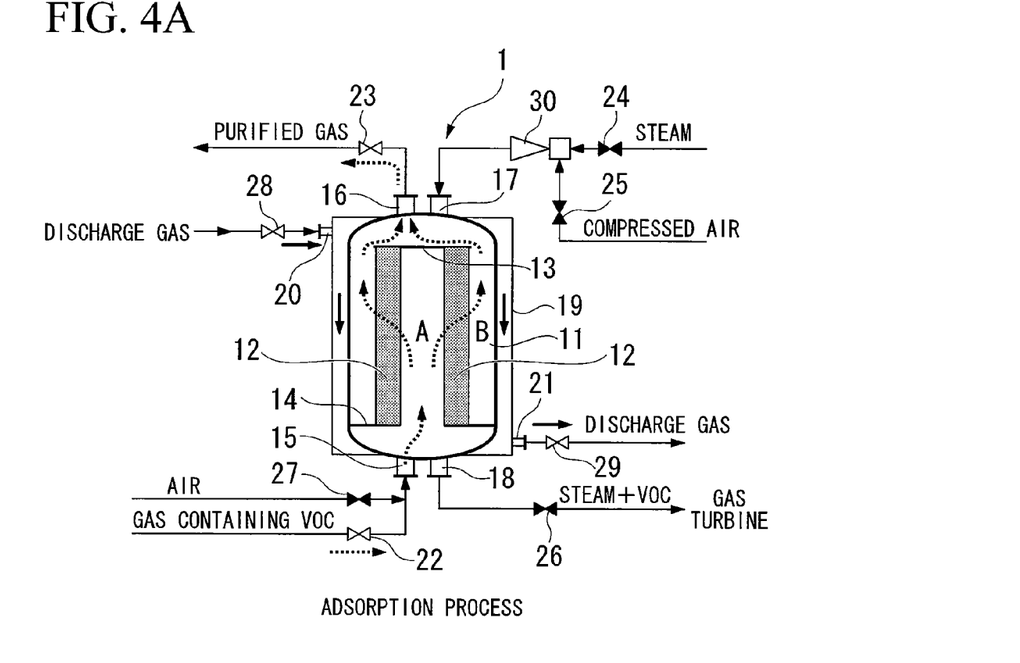
Figure 4B:
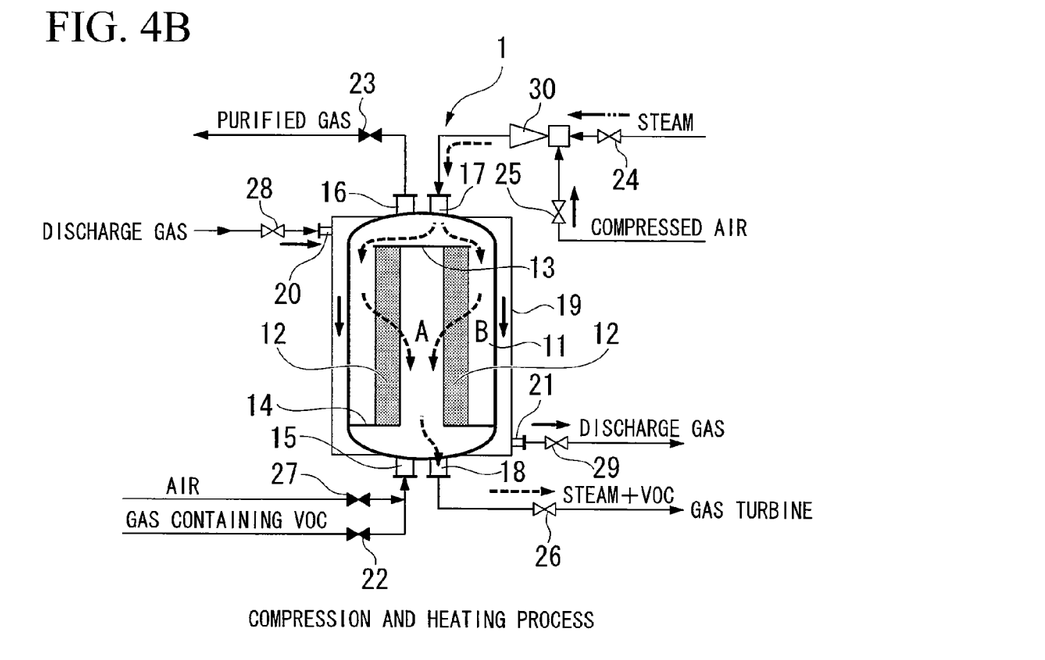
FIG. 4B illustrates the compression and heating process.
Figure 5A:
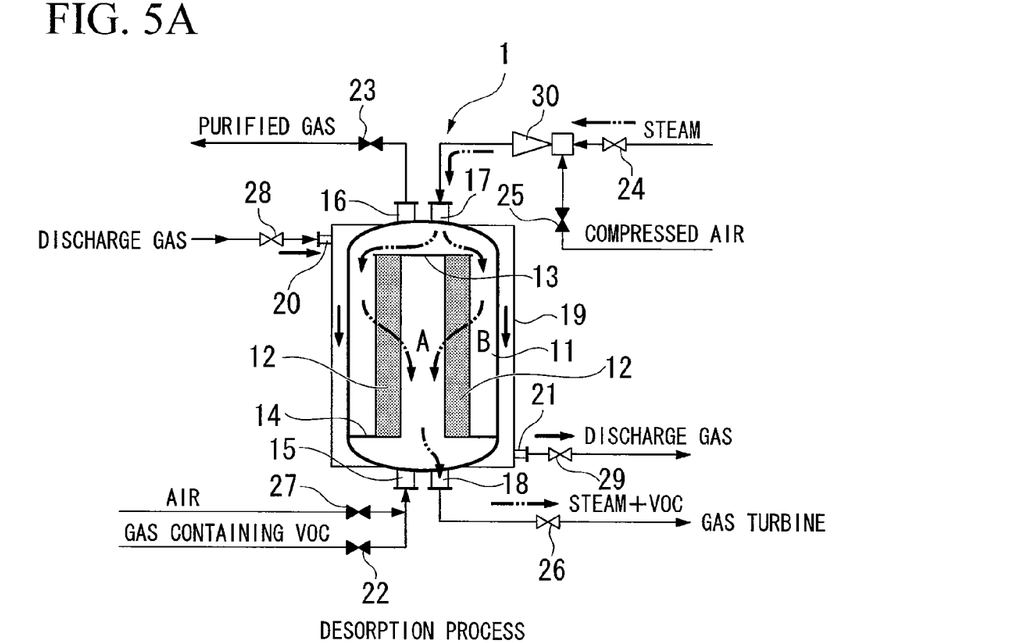
Figure 5B:
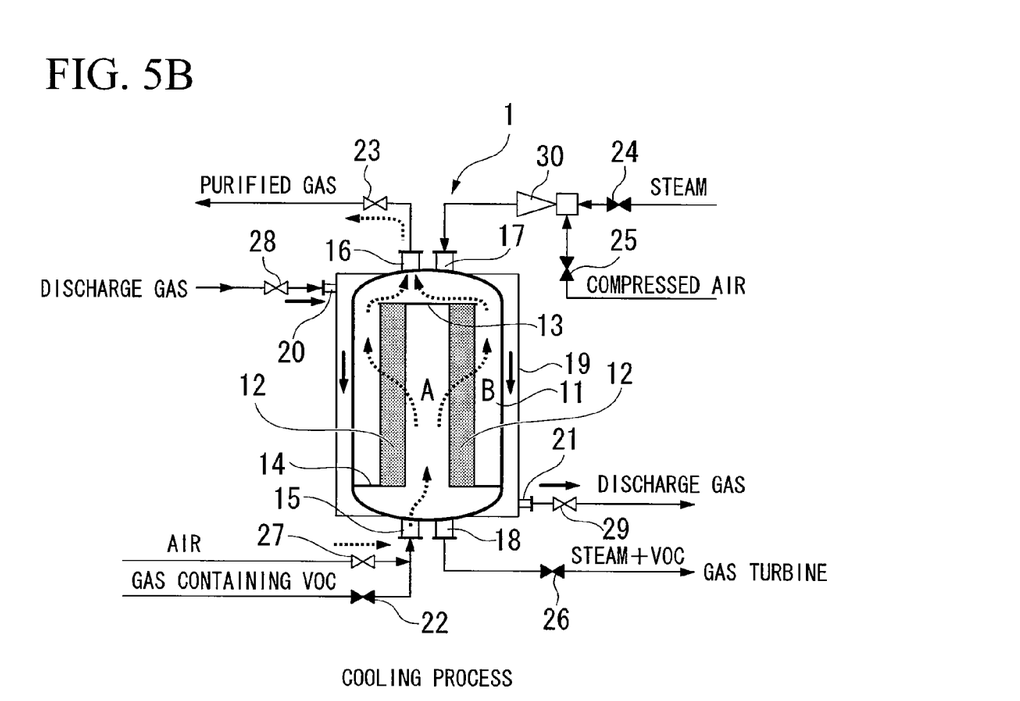
FIG. 5B illustrates the cooling process.

Hereinafter, description will be given of a method of processing the VOC in the thus-structured processing system. FIGS. 4A and 4B and FIGS. 5A and 5B are schematic views illustrating appearances or states in respective processes of the adsorption and desorption apparatus 1: FIG. 4A illustrates an adsorption process; FIG. 4B illustrates a compression and heating process; FIG. 5A illustrates a desorption process; and FIG. 5B illustrates a cooling process. In this adsorption and desorption apparatus 1, these processes are repeatedly carried out, whereby VOC is removed from gas containing the VOC.

Firstly, the control unit 4 renders the open/close valves 22 to 27 in closed states and renders the open/close valves 28 and 29 in open states, so that the discharge gas (combustion gas) is supplied from the gas turbine 2 to the inside of the jacket 19 such that the purification vessel 11 is heated externally or from the outside. At this time, the temperature of the discharge gas from the gas turbine 2 is in the order of 200° C. (or 200 degrees Celsius). When the purification vessel 11 is in a properly heated state, the control unit 4 starts the adsorption process as illustrated in FIG. 4A, i.e., renders both of the open/close valves 22 and 23 in the opened states, supplies the gas containing VOC through the intake port 15 into an inner side room A of the purification vessel 11, and promotes the discharge of purified gas from the exhaust port 16. In this adsorption process, when passing through the activated carbon layer 12, the gas containing VOC is purified such that the VOC contained is adsorbed in the activated carbon, and the thus-purified gas then reaches an outer side room B.

Secondly, the control unit 4 starts the compression and heating process as illustrated in FIG. 4B, i.e., renders both of the open/close valves 22 and 23 in closed states and renders all of the open/close valves 24, 25, and 26 in opened states, such that the steam-compressed air mixture gas mixed at the ejector 30 is supplied through the steam inlet port 17 into an outer side room B of the purification vessel 11 and that the steam containing the VOC is discharged from the steam containing VOC outlet port 18. In this compression and heating process, the steam-compressed air mixture gas which is formed by mixing steam of 180° C. to 200° C. at a pressure of 18 kg/cm$^2$ and compressed air of approximately 380° C. at a pressure of 11 kg/cm$^2$ is supplied in the outer side room B, passed through the activated carbon layer 12 and then enters the inner side room A, whereby the inside of the purification vessel 11 is heated and pressurized and the atmosphere of the activated carbon layer 12 is heated and hence the activated carbon layer is heated.

When the inside of the purification vessel 11 is properly heated and pressurized, the control unit 4 starts the desorption process as illustrated in FIG. 5A, i.e., renders the open/close valve 25 in a closed state and maintains the open/close valves 24 and 26 to be in the opened states as before, such that the steam is fed from the outer side room B to the inner side room A. In this desorption process, under an environment heated to a predetermined temperature, the VOC adsorbed in the activated carbon is desorbed therefrom with the aid of steam passing through the activated carbon layer 12, and mixed in the steam. The thus-desorbed VOC but mixed in the steam is discharged in this mixed state from the steam containing VOC outlet port 18. The steam containing the VOC discharged from the steam containing VOC outlet port 18 is then supplied to the combustor 6 where it is combusted together with fuel gas. The VOC in the steam is combusted in the combustor 6 and thus rendered harmless. The gas from which the VOC was removed is discharged as a combustion gas after having been used to drive the turbine 7 for rotation.

Next, the control unit 4 starts the cooling process as illustrated in FIG. 5B, i.e., renders the open/close valves 24 and 26 in closed states and renders the open/close valve 27 and 23 in opened states, such that air is supplied through the exhaust port 15 into the inner side room A of the purification vessel 11 and gas purified is discharged from the exhaust port 16. In this cooling process, by means of air passing from the inner side room A to the outer side room B through the activated carbon layer 12, the atmosphere of the activated carbon layer 12 is cooled and hence the activated carbon layer 12 is cooled. At this time, although the temperature in the inner side room A drops, the purification vessel 11 is heated by the discharge gas flowing in the jacket 19 and thus maintained in a relatively constant temperature.

Figure 6:
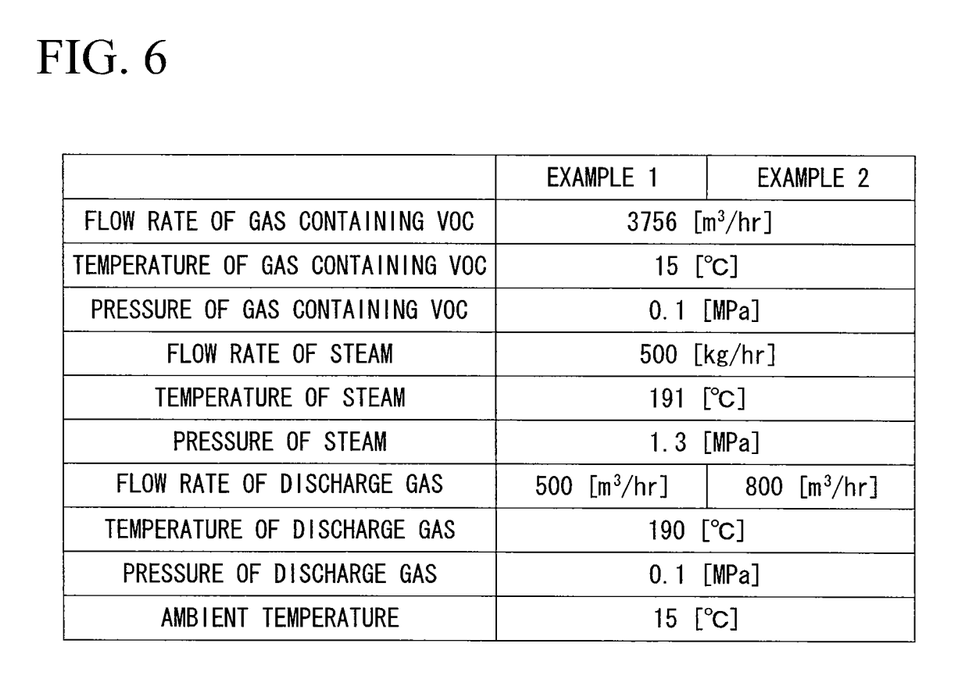
FIG. 6 is a table indicating two types of operation examples of the adsorption and desorption apparatus in the embodiment according to the present invention.
Figure 7A:
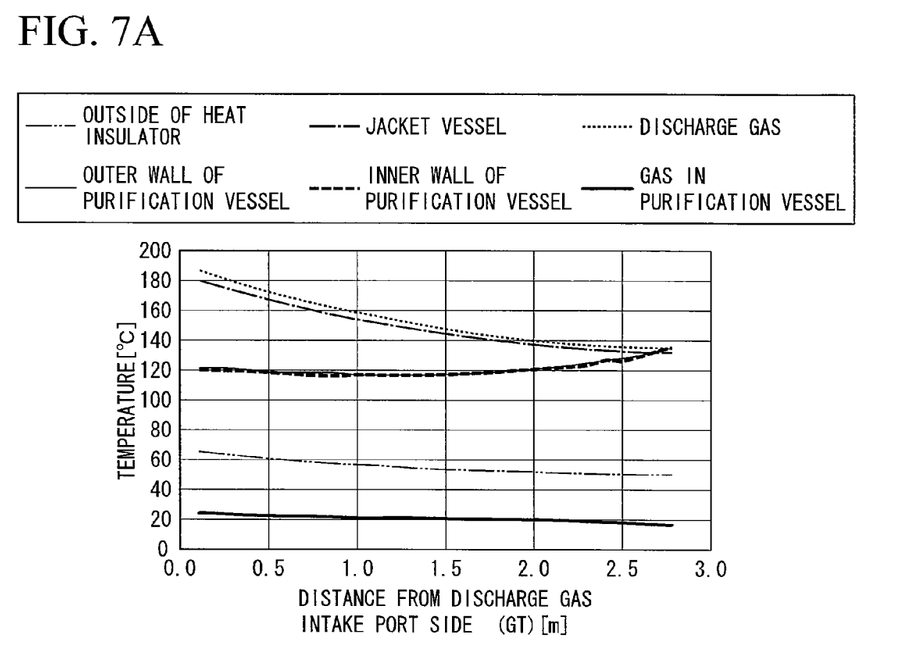
FIGS. 7A and 7B are graphs illustrating temperature distribution along the height-wise direction of the adsorption and desorption apparatus at the end of the adsorption process, in the embodiment according to the present invention.
Figure 7B:
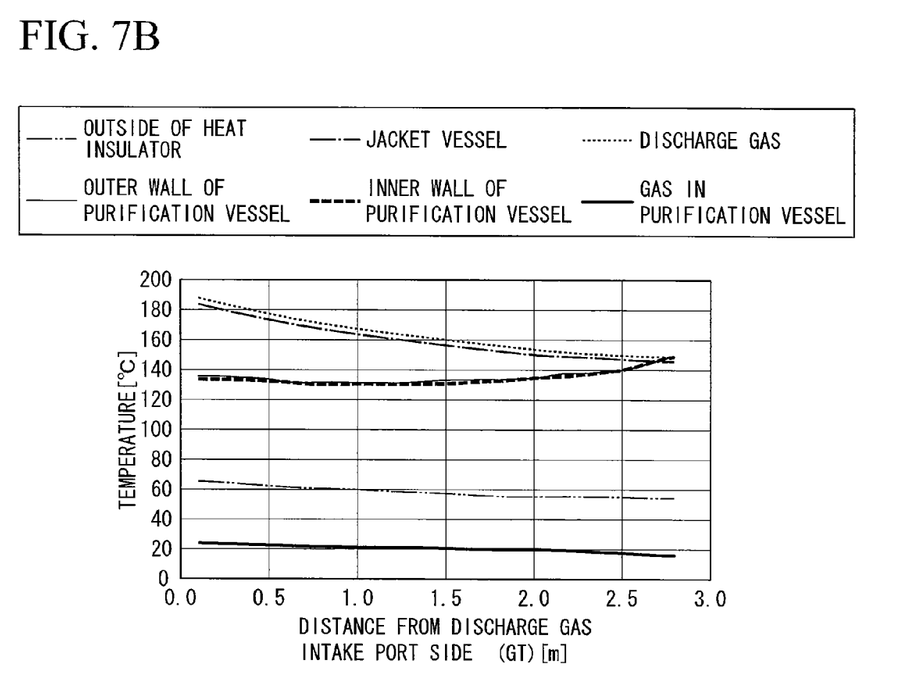
Figure 8A:
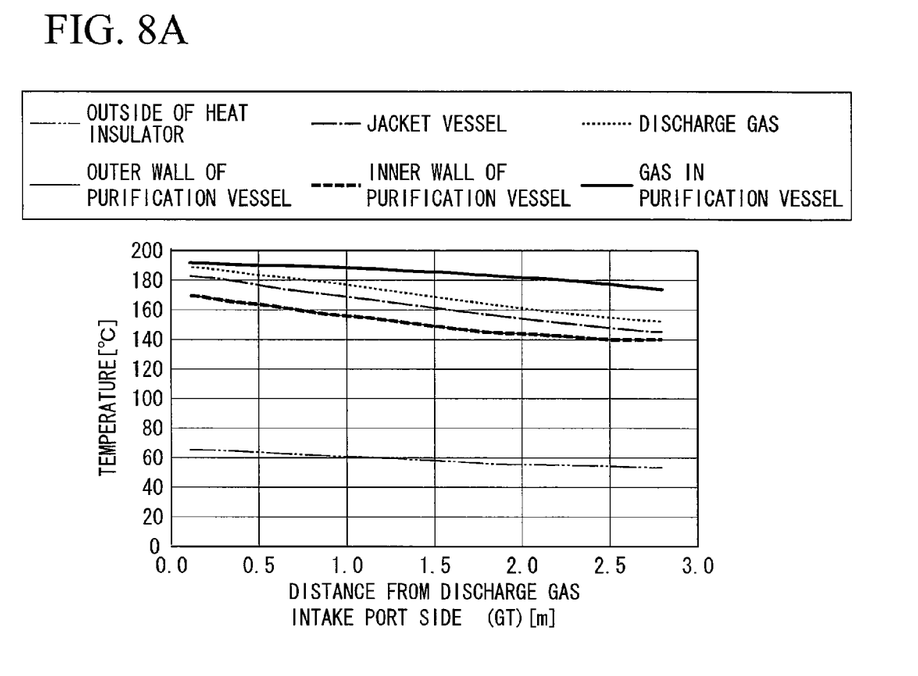
FIGS. 8A and 8B are graphs illustrating temperature distribution along the height-wise direction of the adsorption and desorption apparatus at the end of the desorption process, in the embodiment according to the present invention.
Figure 8B:
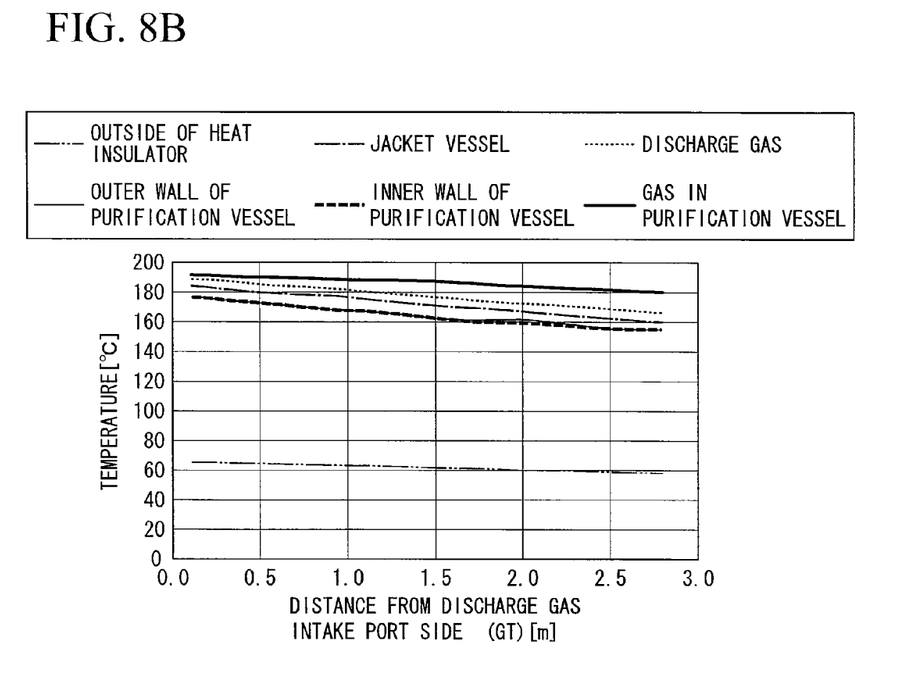

FIG. 6 is a table exhibiting two types of operation examples of the adsorption and desorption apparatus 1. FIGS. 7A and 7B are graphs illustrating temperature distribution along the height-wise direction of the adsorption and desorption apparatus 1 at the end of the adsorption process. FIGS. 8A and 8B are graphs illustrating temperature distribution along the height-wise direction of the adsorption and desorption apparatus 1 at the end of the desorption process. FIGS. 8A and 8B correspond to the operation examples 1 and 2 in FIG. 6, respectively.

Figure 9A:
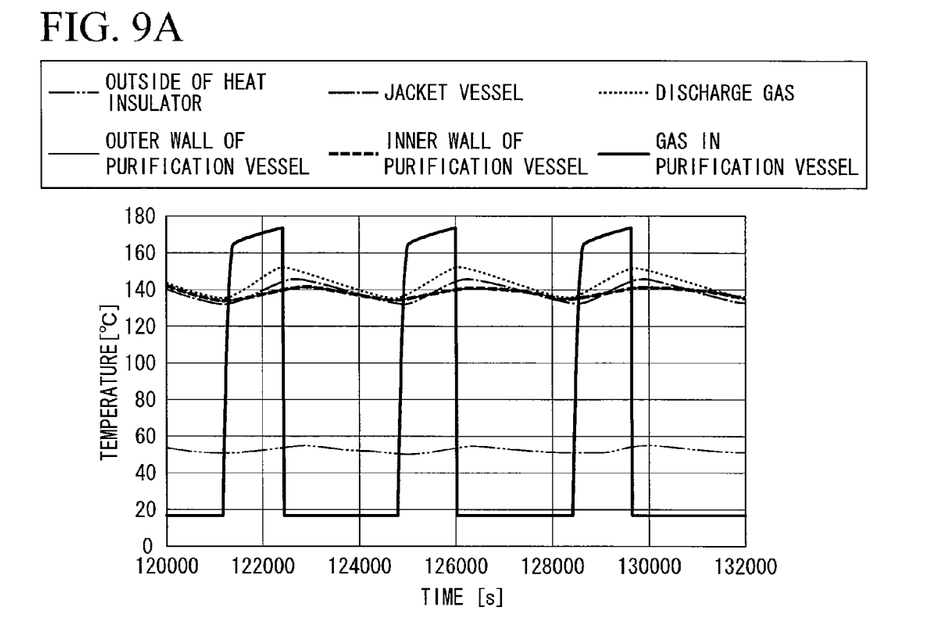
FIGS. 9A and 9B are graphs illustrating a temperature change with respect to time at each portion in the vicinity of the exhaust port, in the embodiment according to the present invention.
Figure 9B:
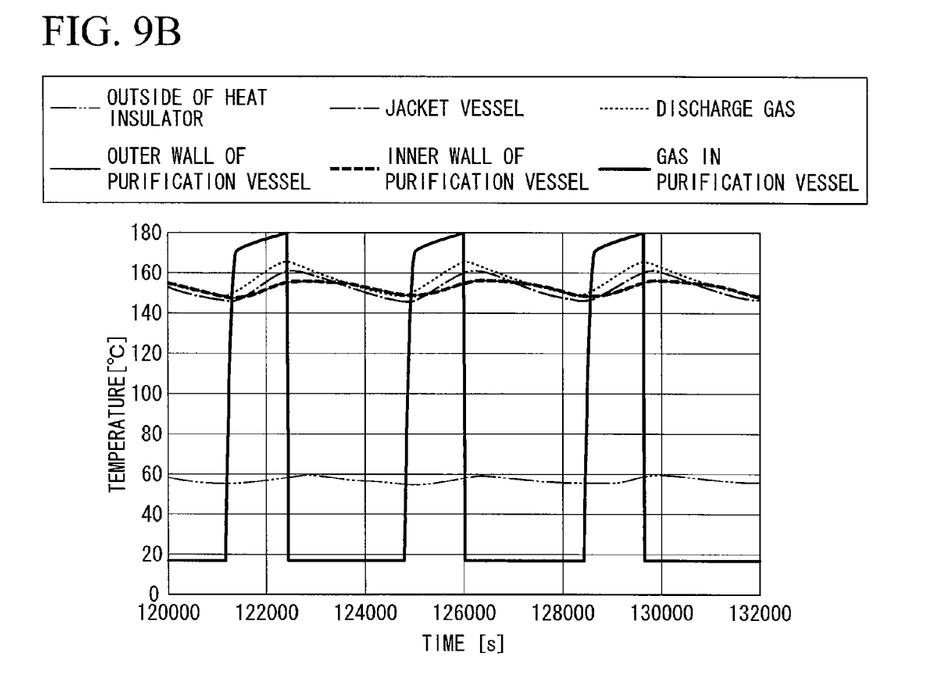

FIGS. 9A and 9B are graphs illustrating a temperature change with respect to time at each portion in the vicinity of the exhaust port 16 and a temperature change with respect to time of the gas in the vicinity of the intake port 15, respectively. FIG. 9A and FIG. 9B correspond to the operation examples 1 and 2 in FIG. 6, respectively.

As illustrated in FIGS. 7A, 7B, 8A, and 8B, temperature distribution at each process is such that a temperature gradually drops as it comes close to the top of the adsorption and desorption apparatus 1. In every process, a temperature of the outside of a heat insulator 19b of the jacket 19 is maintained at a constant value.

Lines illustrated in FIGS. 9A and 9B as the gas inside of the purification vessel depict temperature changes in accordance with process changes in the vicinity of the intake port 15 of the purification vessel 11. These graphs indicate a repeating of a period in which the temperature is approximately 20° C. and a period in which the temperature is 160° C.~180° C. In other words, in the cooling process and adsorption process, the temperature is set to be approximately 20° C., and in the subsequent processes or the compression and heating process and the desorption process, the temperature is set to be approximately 160° C.~180° C. In accordance with this setting, the processes are repeatedly carried out. As illustrated in those graphs, a temperature of the gas inside of the purification vessel 11 changes in accordance with a process change. However, as illustrated in other graphs, a temperature of the discharge gas of the gas turbine 2 flowing between the jacket 19 and the purification vessel 11, a temperature of a vessel 19a of the jacket 19, and temperatures of an inner wall and an outer wall of the purification vessel 11 have constant values or on the order of 140° C. although they somewhat rise and fall.

As described above, even if the purification vessel 11 has a thick wall so as to be durable under a compressed state and accordingly has a large heat capacity, in the present embodiment in which the purification vessel 11 is covered with discharge gas so as to be thermally retained, it is possible to thermally retain the purification vessel 11 at a relatively higher temperature level regardless of the temperature of the gas flowing in the purification vessel 11. Therefore, there is no case in which it takes a long time to raise the temperature of the purification vessel 11 since the purification vessel 11 adsorbs or takes heat therein when being heated in the heating process. As a result, it is possible to raise the temperature of the purification vessel during a short period of time.

Further, in the compression and heating process in which the activated carbon layer 12 is heated, because the purification vessel 11 is retained at a relatively high temperature as described above, it is unnecessary to repeat an operation in which the temperature of the purification vessel 11 is raised each time when it drops. Because highly compressed steam having a high temperature is supplied to the outer side room B and hence to the inner side room A through the activated carbon layer 12, the activated carbon layer 12 is continuously subject to the steam having a high temperature. It is possible to immediately raise the temperature of the surroundings of the activated carbon to a relatively high level such that the activated carbon layer 12 is immediately heated.

Furthermore, according to the present embodiment, in the desorption process in which the VOC is desorbed from the activated carbon layer 12 heated in the compression and heating process, because steam having a high temperature is supplied to the inner side room A and hence to the outer side room B through the activated carbon layer 12, it is possible to retain the surroundings of the activated carbon layer 12 to a relatively high temperature. Thus, the desorbing function or performance can be upgraded.

Still further, in the present embodiment in which air is supplied to the inner side room A and hence to the outer side room B through the activated carbon layer 12 in the cooling process to cool the activated carbon layer 12, the activated carbon layer 12 is exposed to the air even if the temperature of the purification vessel 11 is high. Therefore, it is possible to immediately cool the surroundings of the activated carbon 12 and to thereby cool the activated carbon 12.

Further, in the present system, gas containing the VOC and having a normal temperature is supplied to the inner side room A and hence to the outer side room B through the activated carbon layer 12 in the adsorption process in which the VOC is adsorbed in the activated carbon layer 12 cooled at the cooling process. Therefore, it is possible to retain the surroundings of the activated carbon 12 to a relatively low temperature. Thus, the adsorbing function or performance can be upgraded.

Yet further, in the present embodiment in which discharge gas is utilized to thermally retain the purification vessel 11, it is possible to achieve such heat-retaining of the purification vessel at low cost and to upgrade the adsorbing and desorbing function at low cost. As a result, it is possible to reduce cost for processing the volatile organic compound.

Additionally, in the present embodiment, the purification vessel 11 is heated by means of the discharge gas of the gas turbine flowing in the jacket 19. The invention is not limited to this. For example, a structure is possible in which the purification vessel 11 is heated by means of a heater and the like that is separately provided.

Further, in the present embodiment, the invention is embodied in a volatile organic compound processing system that is constructed in a plant provided with a gas turbine and in which the VOC is processed and combusted in a combustor 6 provided in the gas turbine 2. The invention is not limited to this. For example, a structure is possible in which, when the plant in which the present inventive processing system is incorporated has a boiler provided with a combustor and the like, the VOC is combusted in the combustor of the boiler instead of using the combustor of the gas turbine.

Furthermore, in the present embodiment, after the inside of the purification vessel 11 is sufficiently heated and compressed, an operation proceeds to the desorption process. On the other hand, if there is a case in which a very small amount of steam is condensed in the compression and heating process, an operation may proceed to the desorption process when the steam has been mostly evaporated.

What is claimed is:

1. A method of processing a volatile organic compound, comprising:
    adsorbing in an adsorbent a volatile organic compound contained in gas to be treated;
    desorbing the thus-adsorbed volatile organic compound with the aid of steam and mixing it in the steam, under a pressurized state; and
    combusting the steam containing the volatile organic compound in a combustor, said method of processing further comprising:
    separating a vessel for the adsorption and desorption into an inner side room and an outer side room by means of a separation member part of which is formed of the adsorbent;
    thermally retaining the vessel for the adsorption and desorption;
    at the time of adsorption, supplying the gas to be treated to the inner side room and therefrom to the outer side room through the separation member; and
    at the time of desorption, supplying the steam to the outer side room and hence to the inner side room through the separation member.

2. The method as recited in claim 1, wherein the vessel for the adsorption and desorption is covered with a fluid having a predetermined temperature such that the vessel is thermally retained.

3. The method as recited in claim 2, wherein the fluid includes discharge gas of the combustor.

4. The method as recited in claim 1, wherein, after completion of the adsorption, the vessel is heated by supplying high-temperature compressed air and steam mixed gas to the inside of the vessel.

5. The method as recited in claim 4, wherein, when the ambient temperature of the adsorbent reaches to a predetermined level, the supply of the mixed gas is stopped.

6. The method as recited in claim 4, wherein, when the ambient temperature of the adsorbent reaches to a predetermined level and when a drain formed of the steam being condensed is reevaporated, the supply of the mixed gas is stopped.

7. The method as recited in claim 4, wherein, at the time of the heating, the mixed gas is supplied to the outer side room and then through the separation member to the inner side room.

8. The method as recited in claim 4, wherein, after completion of the desorption, the vessel is cooled by supplying air to the inside of the vessel.

9. The method as recited in claim 4, wherein, at the time of the cooling, the air is supplied to the inner side room and then through the separation member to the outer side room.

10. An adsorption and desorption apparatus, wherein a volatile organic compound contained in gas to be treated is adsorbed in a predetermined adsorbent, and the thus-adsorbed volatile organic compound is desorbed with the aid of steam and then mixed in the steam under a pressurized environment, said adsorption and desorption apparatus comprising:
a vessel for the adsorption and desorption;
a separation member part of which is formed of the adsorbent and by means of which the vessel is separated into an inner side room and an outer side room; and
a heat retainer to thermally retain the vessel,
wherein the gas to be treated is supplied to the inner side room and therefrom through the separation member to the outer side room, and the steam is supplied to the outer side room and then through the separation member to the inner side room.

11. The adsorption and desorption apparatus as recited in claim 10, wherein the heat retainer includes a jacket with which the vessel is covered and a fluid having a predetermined temperature which flows through the jacket and the vessel.

12. A system for processing a volatile organic compound, comprising;
the adsorption and desorption apparatus as recited in claim 10; and
a combustor in which the steam containing the volatile organic compound is combusted.

13. The system as recited in claim 12, wherein a fluid which flows in the heat retainer is discharge gas of the combustor.

* * * * *